United States Patent
Slinker et al.

(10) Patent No.: US 10,262,042 B2
(45) Date of Patent: Apr. 16, 2019

(54) SYSTEM AND METHOD FOR DETERMINING THAT TWO DATA RECORDS RELATE TO THE SAME SUBJECT

(71) Applicant: Ancestry.com Operations Inc., Lehi, UT (US)

(72) Inventors: Geoffrey Scott Slinker, Provo, UT (US); Eugene Greenwood, Orem, UT (US); Ian Stiles, Salem, UT (US); Rey Furner, Pleasant Grove, UT (US)

(73) Assignee: Ancestry.com Operations Inc., Lehi, UT (US)

( * ) Notice: Subject to any disclaimer, the term of this patent is extended or adjusted under 35 U.S.C. 154(b) by 147 days.

(21) Appl. No.: 15/593,854

(22) Filed: May 12, 2017

(65) Prior Publication Data
US 2018/0329911 A1   Nov. 15, 2018

(51) Int. Cl.
*G06F 17/30* (2006.01)

(52) U.S. Cl.
CPC .... *G06F 17/3053* (2013.01); *G06F 17/30312* (2013.01); *G06F 17/30377* (2013.01)

(58) Field of Classification Search
CPC ........... G06F 17/3053; G06F 17/30312; G06F 17/30377
See application file for complete search history.

(56) References Cited

U.S. PATENT DOCUMENTS

| | | | |
|---|---|---|---|
| 2010/0049736 A1* | 2/2010 | Rolls ................. | G06F 17/30294 707/E17.055 |
| 2012/0045150 A1* | 2/2012 | Brummer ............... | G06Q 10/06 382/321 |
| 2015/0019543 A1* | 1/2015 | Dzubay ............. | G06F 17/30241 707/724 |
| 2015/0363481 A1* | 12/2015 | Haynes .................. | G06Q 10/10 707/748 |

* cited by examiner

*Primary Examiner* — Jared M Bibbee
(74) *Attorney, Agent, or Firm* — Kilpatrick Townsend & Stockton LLP (57) ABSTRACT

A data record management system develops person match scores for data records that may relate to the same person or subject. In a genealogical system where the data records are represented as nodes in a family tree, and where multiple data records may relate the same person in question, the data record management system evaluates not only two data records to determine if they relate to the same person, but also individually evaluate various data records pertaining to people that are related to the person in question. Person match scores are calculated by combining sub-scores based on the comparison of corresponding nodes. Sub-scores for nodes pertaining to related people may be adjusted higher even if those notes do not match, to reflect circumstances such as remarriage.

21 Claims, 8 Drawing Sheets

| PERSON MATCH SCORES – RECORD ID 573457217 ||
|---|---|
| RECORD ID | MATCH SCORE |
| 723462178 | 1.00 |
| 323374812 | 0.80 |
| 793847222 | 0.78 |
| 563214898 | 0.75 |
| 172489722 | 0.41 |
| 001387482 | 0.21 |
| ⋮ | ⋮ |

SYSTEM AND METHOD FOR DETERMINING THAT TWO DATA RECORDS RELATE TO THE SAME SUBJECT

BACKGROUND OF THE INVENTION

Systems that collect and manage data records may include data that comes from many sources of information. For example, in the case of systems that manage genealogical data records for family trees, the underlying data may come from directories, birth and death records, marriage records, and census data, as well as supplemental information that may represent the personal recollections of individuals, all collected over time.

Further, the amount of data records available for use in creating family trees has become increasingly larger. One user of a genealogical system may develop a personal family tree and create a data record for each individual in the family tree, based on currently available sources of information. That user may also add information to the data records (e.g., information on relationships, birthplaces, personal achievements, or other notable facts of which they are personally aware) to make the data record more complete. Another user creating a family tree (e.g., a relative of the first user) may go through the same process and create data records for some of the same individuals, but with additional or different information than the data record created by the first user. Thus, there may be multiple data records associated with a single individual that may be represented in one or more family trees.

Genealogical records that become available from many sources (and users) may create technical problems in the management of data by a genealogical system. Not only is there a great deal of information that needs to be sorted when information on individuals is requested (to retrieve only the records for the individuals of interest), but there may be many records that may relate or appear to relate to one individual. With many people contributing to these records, the data may be inconsistent—each contributor may have a different way of entering information or may provide inconsistent data such as birth dates, marriage dates, and so forth, pertaining to the same individual.

The result is that a genealogical system (and its associated databases) may have, for a single person, many data records (sometimes, depending on the number of contributing users, hundreds of individual data records) for one person, some of which may only appear to relate to the same person but could actually relate to a different person (a person having the same name, or other similar background information). When a person is seeking information or building a family tree and requests data relating to a person of interest (such as relatives or ancestors), the system may return many records that potentially relate to that person. This not only reduces the efficiency of the system (by having to query its associated database to retrieve all of the potentially relevant records), but also present to the user a large number of data records that need to be individually reviewed in order to determine whether they actually pertain to the person in question.

There has thus arisen a need for systems (such as genealogical systems), which may have multiple records relating to the same subject, to process the data records in a way to make the retrieval of information more efficient and to provide the most relevant data records to a user.

BRIEF SUMMARY OF THE INVENTION

There is provided, in accordance with embodiments of the present invention, a system for managing data records and determining which of those data records may relate to the same subject.

In described embodiments, a system for managing genealogical records calculates a person match score that reflects the likelihood that two data records or nodes relate to the same person. The data records may appear in a data structure represented as a family tree, with a data record represented as a focus node connected to various relationship nodes. Two different data structures (family trees) have focus nodes compared to each other and other corresponding relationship records compared to each other. The result of the comparison of corresponding relationship records is adjusted when the focus nodes closely match, providing a higher person match score that reflects the likelihood that the two focus nodes relate to the same person or subject.

In one embodiment, a system for managing and retrieving data records, where different the data records may relate to the same subject, and where identifying a selected data record accesses other data records related to the selected data record, includes a first database (data records database) for storing individual data records and relationship data that reflects a relationship between different ones of the data records, each data record represented as a corresponding node in a plurality of nodes, with each node representing data pertaining to a subject, and with nodes interconnected to reflect a relationship between the nodes; a second database (person match score database) for storing subject match scores, each subject match score reflecting, for a given data record stored in the first database, the likelihood that one other data record stored in the first database relates to the same subject, with the subject match scores arranged in the second database so that there is associated, with an identifier for the given data record, one or more identifiers for other data records and the subject match score pertaining to the given data record and each of the other data records; and a data record management system, including a processor for determining whether two of the data records and their corresponding nodes relate to the same subject. The processor is programmed to:

identify a first focus node in the plurality of nodes relating to a first subject;

identify a second focus node in the plurality of nodes relating to a second subject;

identify, for the first focus node, a first plurality relationship nodes directly connected to the first focus node to reflect a relationship to the first subject, the first plurality of directly connected relationship nodes including at least a first relationship node connected to the first focus node;

identify, for the second focus node, a second plurality of relationship nodes directly connected to the second focus node to reflect a relationship to the second subject, the second plurality of directly connected relationship nodes corresponding to at least some of the first plurality of directly connected relationship nodes and including at least a first relationship node connected to the second focus node;

calculate a subject match score for the data record represented by the first focus node and the data record represented at the second focus node, by:

combining a plurality of sub scores, the plurality of sub-scores including at least:

a focus sub-score based on comparison of data in the first focus node to data in the second focus node;

a first relationship sub-score based on a comparison of data in the first relationship node connected to the first focus node to data in the first relationship node connected to the second focus node; and adjusting the first relationship sub-score based on the degree of match from comparison of data in the first focus node to data in the second focus node;

store, in the second database for any given data record, identifiers for one or more other data records and the subject match score pertaining to the given data record and each of the one or more other data records.

A more complete understanding of the present invention may be derived by referring to the detailed description of the invention and to the claims, when considered in connection with the Figures.

DETAILED DESCRIPTION OF THE INVENTION

There are various embodiments and configurations for implementing the present invention. Generally, embodiments provide systems and methods for managing data records of a database, by determining that two of the records relate to the same subject. Embodiments have particular application to databases that store data records reflecting interrelationships. For example, such data records may be present in a genealogical system, where data records pertain to people and their relationships to each other, where the data records may be interconnected as nodes in a family tree, where each node represents a person and data pertaining to that person, and where the various nodes are interconnected to reflect relationships between each person and other persons in the family tree.

As mentioned earlier, multiple users of a genealogical system may create a data record for the same person, based on that user's own information and on information that they may obtain from other sources. Thus data records that each represent the same person may appear in multiple family trees and be created by different users. Each of those same-person data records may have different information (and different levels of detail) depending on the accuracy and amount of information known to the user that created the data record. When subsequent users seek data records (e.g., to build their own family trees), there may be many data records that appear to represent one person, but the different information and level of detail in each may make it difficult to have confidence that they do in fact relate to the same person. Embodiments of the present invention provide for data records that may relate to the same person to be evaluated and assigned a "person match" score, based on the likelihood that they are in fact related to the same person. These described embodiments use the unique nature of relationships established between data records (such as the relationships in a family tree), and take into account how those relationships might result in different data at corresponding nodes, to calculate a "person match" score.

One particular technical advantage and feature of described embodiments is the increased system efficiency in sorting through potentially related data records, and the system efficiency accomplished by reducing the number of potentially related data records being returned to a user.

A user requesting retrieval of data records relating to one person will receive records based on person match scores, so that only those records most likely related are presented to the user.

Another advantage and feature of described embodiments is the leveraging of stated relationships between records, such as those found in genealogical and other systems where data records not only reflect underlying data, but also reflect the relationship of data records to each other. As will be described in greater detail below, embodiments of the invention evaluate not only underlying data pertaining to a specified subject (or person) in question, but also selectively evaluate data records having a relationship (such as a familial relationship) to the subject in question to find matching data and take into account reasons relationship data may be inconsistent.

Figure 1:
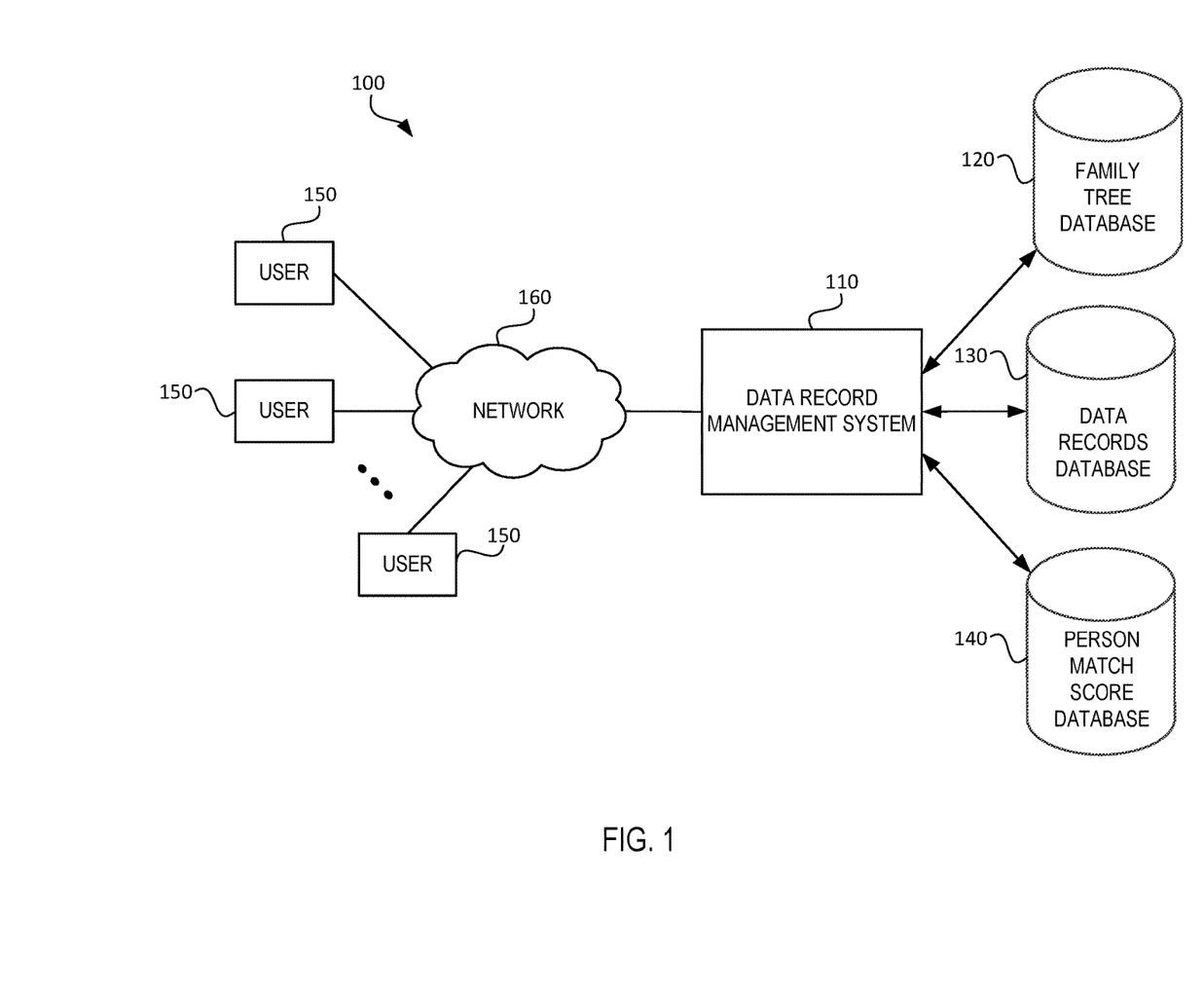
FIG. 1 is a general block diagram showing a genealogical system, including a data record management system, that generates and uses person match scores reflecting whether data records pertain to the same person.

Referring now to FIG. 1, a genealogical system 100 according to one embodiment of the invention is illustrated. The system 100 manages genealogical data, such as data records used to build family trees. The system includes a data record management system 110 for managing a family tree database 120, a data records database 130 and a person match score database 140. The family tree database 120 stores data structures representing family trees, including data records representing people in the family tree and the relationship between those people. Data records database 130 stores individual data records, each of which may be available for a user to select for a family tree (a newly created record or a pre-existing data record that may or may not have already been associated with a person in a family tree) and that may include underlying data identifying both a person and also relationships the person may have to other people (and their data records) in a family tree. And it should be appreciated that although FIG. 1 illustrates databases 120, 130, and 140 being physically separate databases, in some embodiments any two or more the databases 120, 130, and 140 could be physically incorporated into a single database or database system.

Users 150 (through end user systems, such as personal computers, smart phone devices, etc.) may access the data record management system 110 by way of a network 160. The network 160 may be any suitable communications network, such as the Internet. Accessing the data record management system 110 permits users to access and view family tree data stored in database 120, access and contribute to individual data records stored in database 130, and to create new family trees to be stored in database 120.

The person match score database 140 stores person match scores that have been calculated by the management system 110 to reflect the likelihood that any two data records relate to the same person. The particular structure of the stored person match scores and the manner in which they are arranged in database 140 will be described in greater detail later.

Figure 2:
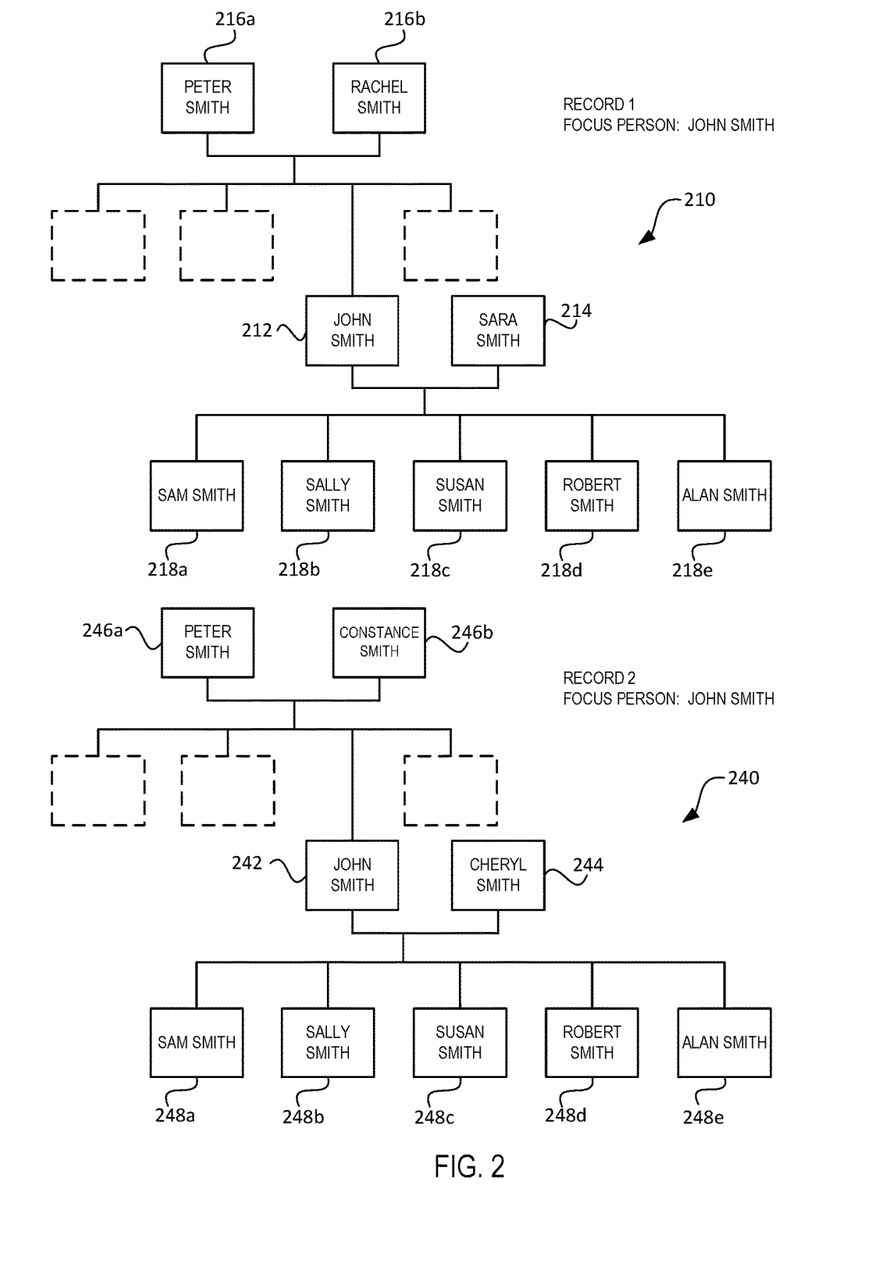
FIG. 2 illustrates two data structures in the form of family trees, having data records illustrated the form of nodes that each represent a person, and where one data node in each of the two family trees may represent the same person.

FIG. 2 illustrates two family tree data structures 210 and 240 stored in the database 120 of FIG. 1. The overall structure of the two family trees is similar, namely, a plurality of data nodes that each pertain to a single person and that are interconnected to reflect a relationship between that person and persons represented at other nodes in the family tree. For purposes of describing embodiments of the invention, each data node represents a data record for the subject of the node (a person), including not only data useful in identifying the person (such as information on the name, birth, marriage, and death of the subject), but also data identifying individuals with whom the subject may have a relationship. For example, while not shown in FIG. 2, each node may have an assigned node or person identifier for the subject, and each node may include information on node identifiers for people that have been identified as having a relationship to the subject (such as a parent, spouse or child). Also for purposes of describing embodiments of the invention, the family tree 210 has a focus person or node 212 (Record 1—John Smith) and family tree 240 has a focus person or node 242 (Record 2—John Smith). Other nodes that are connected to each of the focus nodes (representing relatives of the focus person) are collectively referred to herein as relationship nodes.

Although there may be many generations reflected in a family tree, to reduce the complexity of the description, the family tree data structures in FIG. 2 show only three generations, with siblings of the focus person shown in dotted lines, since described embodiments may not involve analysis of individual sibling nodes (although such analysis is not necessarily precluded).

One purpose carried out by the management system 110 of FIG. 1 is to determine whether focus nodes 212 and 242, which both have a subject with the same name ("John Smith"), do in fact relate to the same person. While the nodes 212 and 242 both are associated with the same name, in the exemplary family trees of FIG. 2, focus node 212 in family tree 210 has different spouse represented at node 214 ("Sarah Smith") than the spouse represented at corresponding node 244 ("Cheryl Smith") in family tree 240. Further, while the focus nodes are shown having the same father ("Peter Smith") at nodes 216a and 246a, the focus node 212 has a different mother represented at node 216b ("Rachel Smith") than the mother represented at corresponding node 246b ("Constance Smith") in family tree 240.

Existing systems for analyzing two data records to determine if those records relate the same person often compare all of the data at the focus node and the surrounding nodes, including spouse, parents and children, and to the extent such overall data may be different (or if it were present in one family tree and not in the other), the two data records or nodes (such as the focus nodes 212 and 214 in FIG. 2) may be found to represent different persons. As will be evident as this description progresses, the present invention, among other things, provides algorithms that individually examine corresponding pairs of relationship nodes (rather than examining multiple corresponding pairs of relationship records together), create sub-scores based on the relationship nodes, and combine the sub-scores in a way to provide a person match score that better reflects the likelihood that two nodes match, even if individual relationship nodes associated with the focus node are different.

Figure 3:
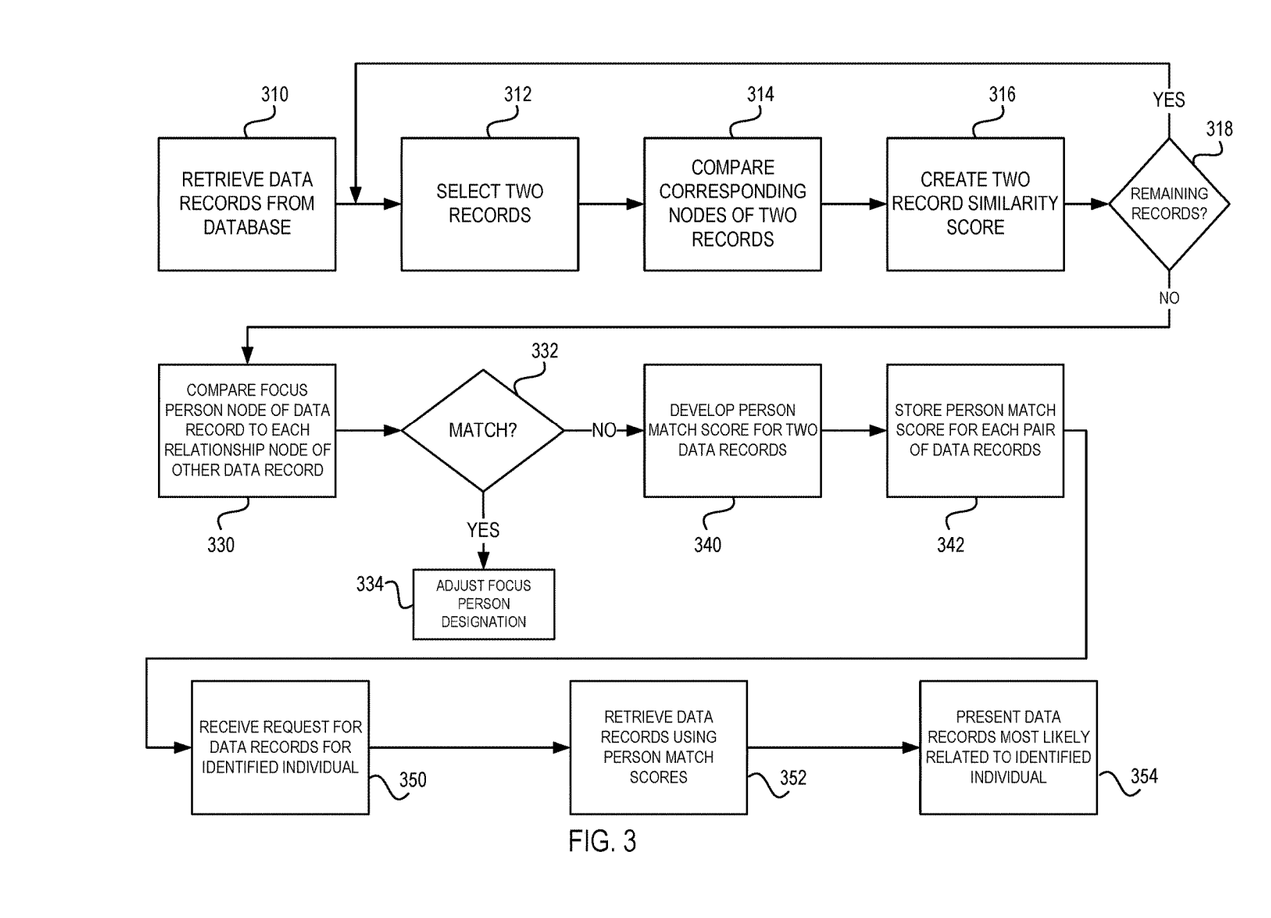
FIG. 3 is a flow diagram illustrating a general process for evaluating two data records, such as those represented in family trees seen in FIG. 2, and developing and using a person match score that reflects the likelihood that a data record or node in each family tree relates to the same person.

FIG. 3 illustrates a process implemented within management system 110 for assigning a person match score to two data records, and using the match score to manage those two data records. The initial steps are used to evaluate various records within the database 130 and determine which records may relate to others. Thus, a number of the records in the records database 130 are retrieved at step 310, and two of those records are selected (step 312) and compared at step 314. The comparison at step 314 is not done for a person matching score, but rather to create a "similarity" score (step 316) between the two selected records, based on the overall similarity of those data records and multiple data records (or nodes) that have a relationship to those two data records. Thus, at step 314, the data at the two selected nodes, and the data in various relationship nodes connected to the selected nodes, are compared.

For example, in the exemplary family trees seen in FIG. 2, the similarity score for nodes 212 and 242 (the focus person nodes) would involve the comparison of all corresponding data in those family trees, including the comparison of focus person data, parent data, sibling data, spouse data and children data at the nodes in those two family trees. In some cases, the comparison could also extend to additional generations, although in those cases it would be recognized that the further the data is removed from the focus person, the less likely it is that there will be data to match, particularly since the family trees have been created by different users.

As discussed earlier, a similarity score obtained from an overall comparison of data across family trees for determining if two focus nodes represent the same person is not an effective way of determining if the two focus nodes actually match. In many cases, there may be significant differences in the data since the two users creating the family trees may have had different sources of information and perhaps different views of what information is relevant. As an example, in the two family trees seen in FIG. 2, and as will be discussed in greater detail later, the spouses and mothers of the person at the focus person nodes are different, and although this difference may indicate that the people in question are not the same, the difference could be attributable to unique family circumstances, such as remarriage (particularly, when a person creating the family tree has a relationship to a spouse in one marriage but not a direct relationship to the spouse in the other marriage).

The result of the steps 312-316 would be a two record similarity score for each pair of records that are retrieved at step 310. At step 318, after each similarity score is created, the management system 110 determines whether any data records remain that need to be compared. If there are, the process at step 312-316 continues. If there are no remaining records from those retrieved from the database at step 310, the process proceeds to step 330, where only the focus person data node relating to one of the two records is compared to each relationship data node of the other data record. The purpose of this particular step is to make sure that the proper corresponding focus person nodes are being evaluated, and that one of the nodes being compared might more appropriately be a relative of the other focus person node. Thus, if one of the focus nodes has a high degree of match (name, birth, marriage, death and other relevant data stored in the node) to a relationship node in the other family tree (step 332) then the system may change the focus person node for one of the nodes being compared (step 334), by re-designating the closely matching relationship node as a focus node to be compared, and repeat steps 312-316 as appropriate for those newly paired focus person nodes.

As will be described shortly, the similarity score for each pair of selected data records may be used to determine which pairs of records should be evaluated for person match scores. As such, and although not illustrated in FIG. 3, a similarity score for each pair of data records may be stored by the management system 110 for subsequent use in the process (e.g., similarity scores may be stored temporarily, or permanently if desired, in the person match score database 140). Also, and as discussed previously, the similarity score for pairs of data records created at step 316 may not accurately reflect whether the two people represented at the paired records/nodes are the same person, particularly when data at connected relationship nodes may be significantly different (such as with the parents and spouses illustrated in the family trees of FIG. 2). Accordingly, in accordance with embodiments of the invention, a more relevant person match score is calculated for each pair of data records at step 340. One embodiment for calculating a person match score will be described shortly, with reference to FIG. 4. Briefly, a person match score for each pair of records is based on combining various sub-scores calculated by comparing the corresponding focus person nodes and comparing various corresponding relationship nodes connected to the focus person nodes. Once the person match score for each pair of records or nodes is calculated, those scores are stored in person match score database 140 (step 342), in a manner to be described shortly.

It should be noted that not all data records retrieved from the records database 130 will be presented to the management system 110 to calculate a match score. While a relatively low threshold of similarity can be used as a basis for presenting two records for a person match score (since a relatively low similarity score for a pair of records may still lead in some cases to a person match score that reflects the pair of records do in fact relate to the same person), the threshold will not be so low as to present too many records for a person matching score with other records. In one embodiment, similarity scores established at step 316 could be in a range from 0 to 100 (with 100 representing the highest degree of similarity). In such embodiment, one could, for example, establish a similarity score of 50 (out of 100) as representing the threshold at which two records will be presented for developing a person match score at step 340.

After person match scores have been stored, it is anticipated that a data record for an identified person may be requested from the management system 110 from one of the users (step 350). In accordance with one embodiment of the invention, the requested data record may result from a user who is examining a family tree that has been stored in the family tree database 120, such as might be the case when the user is creating a new database and wants to see whether a recognized person may have other data records in the system. In alternative embodiments, a user might simply enter search criteria such as a name (and other identifying information, e.g., date of birth and, birthplace), and the management system 110 may return one identified data record that appears to best match the search criteria or a data record that has the best quality data for the identified person (e.g., the data record with the most complete information on that person or a data record that has information from the most trustworthy or verifiable sources, such as official government records relating to vital statistics). Such one returned data record might be designated the "primary" data record for the identified person.

At step 352, a record (e.g., the "primary" data record) for the identified person and a predetermined number of data records that appear to relate that same person (based on person match scores between the requested data record and the other related data records) are returned to the user, and presented to the user (e.g., displayed at a user device), step 354. As discussed earlier, person match scores permit the records that are most likely to relate to the same person to be presented to the user. Parameters can be established either by the user or by the design of the system 110 to determine how many records might be returned. As an example, a user might request to see up to 10 records that appear to match. In other cases, any number of records might be returned to the user, but the records are sorted based on the person match scores (and thus the likelihood that they relate to the same person).

Figure 4:
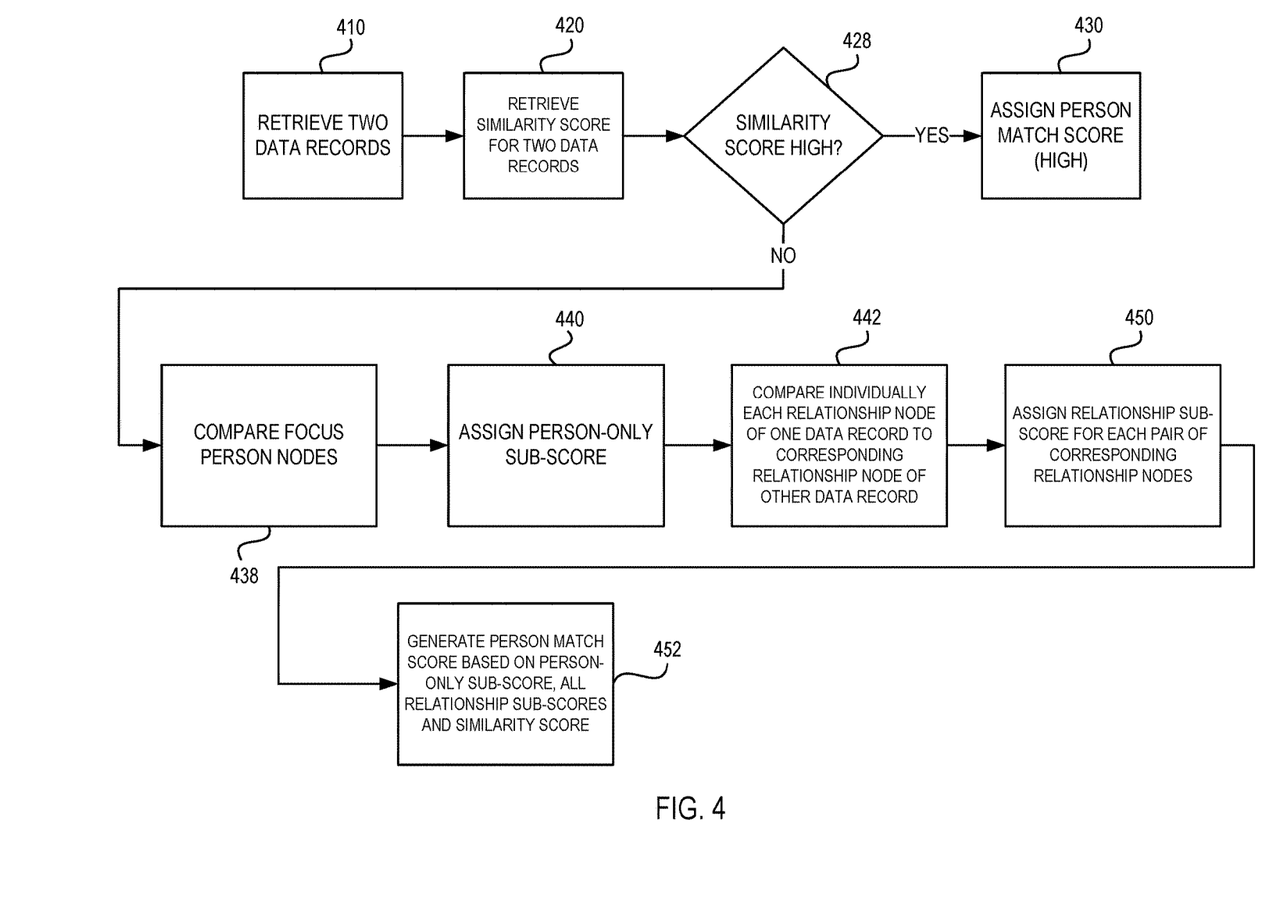
FIG. 4 is a flow diagram illustrating a process for developing a person match score for two data records.

One embodiment for creating person match scores is illustrated in FIG. 4. At step 410, two data records are retrieved from data records database 130 and evaluated. At step 420 the similarity score for those two data records is likewise retrieved (e.g., from the person match score database 140, if temporarily stored there). One use of the similarity scores would be to simply convert them into a person match score if the similarity score is very high. For example, using the embodiment described earlier, if similarity scores range from 0 to 100, and two records have a very high similarity score of, say, 98, then it is very likely that those two records do in fact represent the same person and a correspondingly high person match score can be assigned to that pair of data records. Thus, at step 428, after each pair of data records is retrieved, the similarity score is examined and if it is determined to be high enough to reflect that the data records relate to the same person, those two records are assigned a high person match score at step 430. For example, if a person match scores also range from 0 to 100, and the management system 110 has been programmed to determine that any similarity score at 90 or higher should be given an assigned a person match score at step 430, then management system 110 may assign a person match score having the same value as the similarity score for those two records.

If the similarity score is not determined to be high at step 428, then the remaining steps in the process of FIG. 4 determine a separately calculated person match score. In general, these steps involve separately comparing the pair of focus person nodes and each corresponding pair of relationship nodes associated with each data record to create sub-scores that are subsequently used to arrive at a person match score. At step 438, the two focus person nodes are compared to each other and, at step 440, a person-only sub-score for the two data records is assigned based on that comparison of only the corresponding focus person nodes. For example, the sub-score could be for a range from 0 to 100, with 100 representing the highest possible match between the focus person nodes in the pair of data records. The, at step 442, each specified relationship node related to the focus person node in one data record is compared to the corresponding relationship node in the second data record. Specifically, in one described embodiment, spouse nodes (such as the nodes 214 and 244 in FIG. 2) are compared, parent nodes (such as 216a, 216b and 246a, 246b in FIG. 2) are compared, child nodes (such as nodes 218a-218e and 248a-248e in FIG. 2) are compared, and sub-scores based on each comparison are assigned at step 450. In other cases, a child may be present in one tree but not in the other. Since this may reflect only one user's perspective on who the children are (or were), the comparison could be done for only nodes that are present in both trees. It should be appreciated that comparison of some corresponding nodes (e.g., child nodes) can be based on which nodes appear to represent the same person, such as based on the nodes that have similar names or event data.

The comparisons of the specific nodes and the assignment of sub-scores (steps 438-450) take place and are considered in the context of the comparisons of other nodes, in order to take into account reasons why some corresponding nodes may match and other nodes may not.

Using again the example set forth in FIG. 2, if spouse nodes do not match at all, but some or all of the child nodes do match, the combination of sub-scores may be done in a way to reflect the likely remarriage of the person at the person focus mode, with the ultimate person match score not significantly lowered because of the remarriage. As another example using FIG. 2, if the mother nodes do not match at all, but the father nodes are close match, the combination of sub-scores may be done in a way to reflect that the mother may be a step-mother to the focus person (for example, the person creating the family tree, who may have been one of the children of the focus person, knew only the stepmother and thus more likely would show such person in the mother relationship node). In some cases, the calculation of sub-scores may also be based on dates, such as dates of death reflected at each node, and if the spouse or one parent of the focus person is shown as deceased (and having a date of death) in one family tree, and the corresponding spouse/parent in the other family tree is shown with a different name and not shown as deceased, then the underlying algorithms can be used to determine that a remarriage has taken place and that the differences in those corresponding nodes should not result in the person match score being significantly lowered because of the remarriage.

It should be noted that the comparison of corresponding relationship nodes is not considered in isolation relative to the focus person node, for purposes of calculating sub-scores. For example, if spouse nodes do not match at all, but focus person nodes are close match, then the sub-scores are calculated in a way that do not unduly lower the person match score on account of the spouse nodes. It should also be noted that the term match does not mean, in the context of matching the data in corresponding nodes, an exact match. As described earlier, different users may have different levels of detail available when they create data records, and so a match of two nodes may be determined when most, even though not all, of the underlying data matches. As an example, the fact that one set of nodes have dates of birth and the corresponding nodes in the other set of nodes do not, may be excluded as a factor in determining whether nodes match. Specific examples of data contained in a node and using threshold differences to determine whether the data is deemed to match, will be described shortly.

At step 452 a person match score for the two data records is generated based on the sub-scores as generally described above. An example of the calculation of a person match score based on various sub-scores will also be given shortly.

Figure 5:
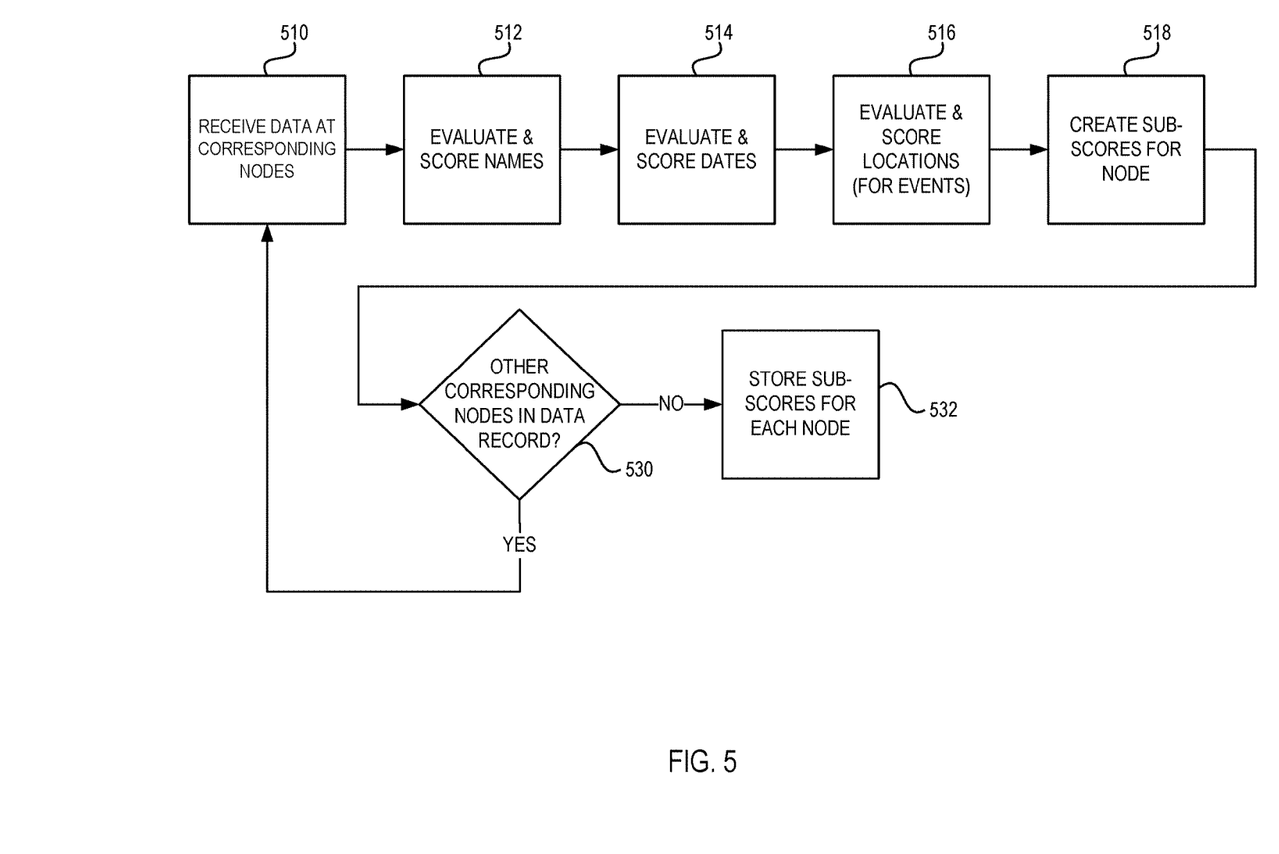
FIG. 5 is a flow diagram illustrating the evaluation of individual data fields within two data records, in order to calculate sub-scores that are combined to develop a person match score.

FIG. 5 illustrates a specific process undertaken during the comparison of nodes, such as the comparisons described in connection with FIG. 4, steps 438 and 442 (i.e., comparisons of each pair of focus nodes and each pair of corresponding relationship nodes). As described earlier, each node may contain different types of underlying data (data fields) relating to the person represented at the node, such as names and events (birth, marriage, death etc.). The comparison of this underlying data is illustrated in FIG. 5.

At step 510, data fields within corresponding nodes of the two data records are received at management system 110. At step 512, the name information at the two data records or nodes are evaluated and scored based on the degree of match. Similarly, for each of the events represented in the data, at step 514 the dates of those events are evaluated and scored (e.g., date of birth, date of marriage, date of death). At step 516, location information (if available) on the events are evaluated and scored (e.g., where the person was born, where the person was married, and where the person died). At step 518, a sub-score for the compared nodes is then created based on the evaluation of data fields at steps 512-516. If there are other corresponding nodes to be evaluated (step 530), then the process returns to step 510 for receiving and then evaluating the data fields in those nodes (steps 512-518). After all the corresponding nodes have been evaluated, the various sub-scores that have been assigned at step 518 are stored (e.g., temporarily at person match score database 140) in order to combine those sub-scores into a person match score (step 452, FIG. 4).

The following Table I illustrates an example of comparing specific data fields for purposes of creating sub-scores at step 442 (FIG. 4):

TABLE I

| Data Field | Person A | Person B | Component Score |
| --- | --- | --- | --- |
| Given Name | John | Jon | .95 |
| Surname | Schmidt | Schmidt | 1.0 |
| Birth Date | 1900 | 1901 | .75 |
| Birth Location | Pennsylvania | Penn | 1.0 |
| Marriage Date | 1925 | 1924 | .75 |
| Marriage Location | Ohio | Dayton | 1.0 |
| Death Date | 1990 | 1989 | .75 |
| Death Location | Ohio | Columbus | 1.0 |

In this example, the total (sum) of the component scores is 7.2, which could be normalized on a scale of 0-100 as 72, reflecting a reasonably good match. The component score could be based on various rules/algorithms, such as using a Levenshtein distance between words, but also recognizing a true match in the case when full names and known abbreviations are used and when compared locations indicate a state and a known city within that state (as illustrated above). For dates, the following exemplary rules could be applied:
If within past 50 years:
Perfect match—1.0
One week difference—0.95
15 day difference—0.90
31 day difference—0.88
6 months difference—0.84
9 months difference—0.80
1 year difference—0.75
2 year difference—0.67
3 year difference—0.5
5 year difference—0.25
If the day and month match perfectly an additional 0.1 is added to the score from above.

If not within past 50 years:
Same year—1.0
1 year difference—0.75
2 year difference—0.67
3 year difference—0.5
5 year difference—0.25

These rules are, of course, exemplary, and other or different rules could be developed based on feedback from system users over time confirming matches, and could also be developed using machine learning (over time based on system use).

The following Table II is an example of a calculation of a person match score based on the comparison of data nodes in the family trees illustrated in FIG. 2, for the focus nodes 212 and 242:

TABLE II

| Person Only Sub-score | 90 |
| Person/Father Sub-score | 97 |
| Person/Mother Sub-score | 50 |
| Person/Spouse Sub-score | 50 |
| Person/Children Sub-score | 95 |
| All Relationships Sub-score | 62 |
| Person Match Score (Normalized) | 74 |

The combined (summed) sub-scores in the above example in Table II provide a total of 518 (out of a possible 700) and are normalized to a person match score of 74 (out of a possible 100), which would reflect a relatively high likelihood that the data records at the two focus nodes relate to the same person.

As should be appreciated from the above (and as will be discussed in more detail below), each sub-score is calculated using algorithms implemented in a compare module such that sub-scores for relationship nodes (i.e., sub-scores other than the Person Only (focus person) and All Relationships (all nodes), are not necessarily based on simple data to data comparisons. Specifically, in order to take into account the reasons for certain relationships not matching, such as the spouse nodes 214, 244 and mother nodes 216b, 246b in FIG. 2, the sub-scores take into account the degree to which the focus person nodes match. Hence, the Person/Mother sub-score is not based on a simple match between nodes 216b and 246b (which would be a zero match), but rather takes into account a good/close match of the focus nodes (Person Only Sub-score), for the reasons given earlier (such as taking into account a possible remarriage). Thus, in this example, even though the mother nodes 216b, 246b have no matching data, the sub-score is not shown as zero in Table II above, but rather is adjusted (higher) to 50, because of the high degree of match of the focus person nodes (reflecting the likelihood that there has been a remarriage). This is in contrast to prior systems (as discussed earlier) which use only a similarity score between data records (which in this embodiment would be the same as the All Relationship Sub-score). Thus, the person match score in this example more accurately reflects the likelihood of focus nodes 212 and 242 matching, even though the data in corresponding mother and spouse nodes are not all the same.

In some embodiments, a specific relationship sub-score could also be adjusted (higher) if not only the focus person modes match, but also other relationship nodes closely match (e.g., if only mother nodes do not match—due to likely remarriage—and other relationship nodes, such as father, spouse and children, all closely match), the Person/Mother sub score could adjusted even higher than would be done for the case of only a focus person match).

Figure 6:
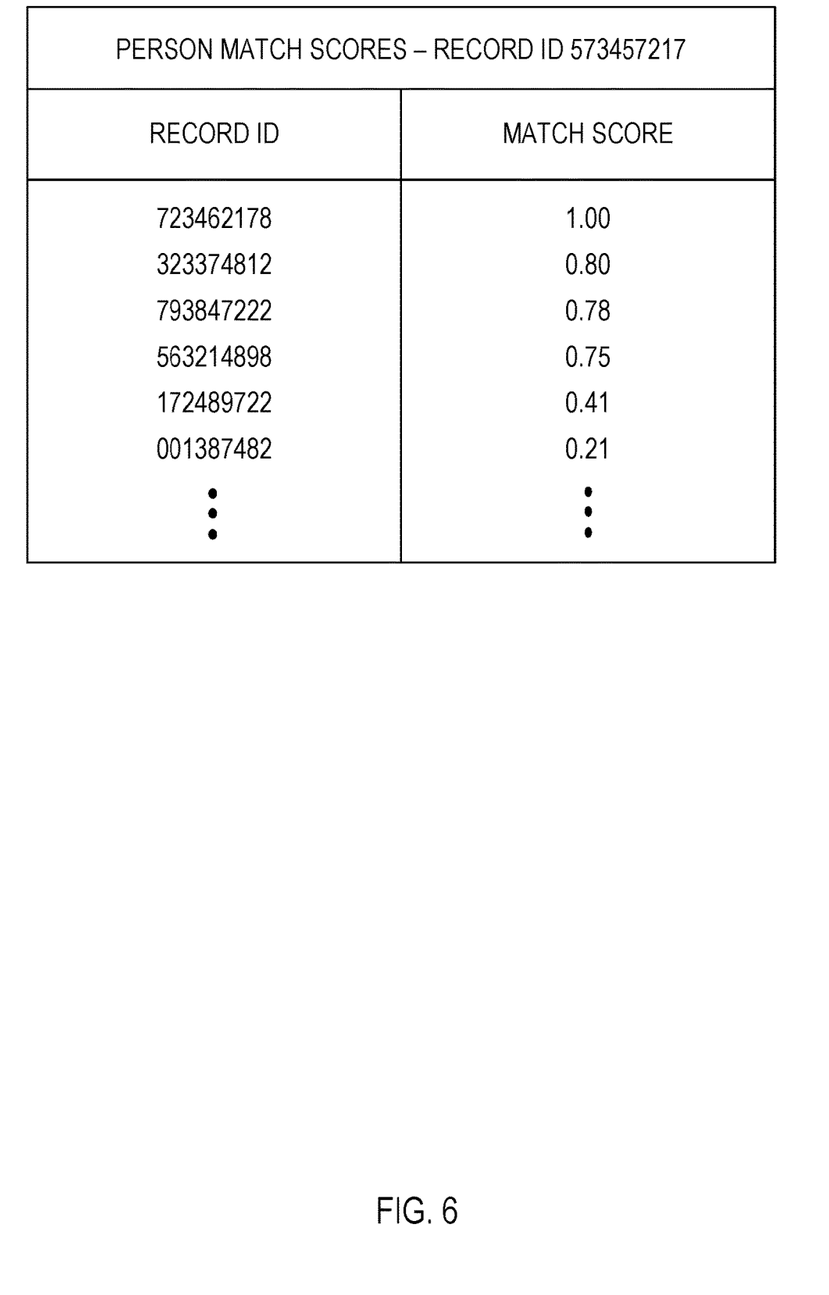
FIG. 6 illustrates person match scores associated with a given data record, reflecting the likelihood that the given data record and other different data records may relate to the same person.

FIG. 6 illustrates one embodiment of an arrangement of person match scores (after calculated at step 452, FIG. 4) stored in person match score database 140. As can be seen, for each given data record or node (in FIG. 6, such given data record is identified as Record ID "573457217"), there is a person match score for each of a number of other data records or nodes (identified by their Record IDs). When the person match scores are arranged in the match score database 140 as illustrated in FIG. 6, they are arranged and structured (as seen in FIG. 6) for efficient retrieval such that, when a specific data record for a person is identified (such as by their Record ID) each other data record that could match can be readily retrieved and presented to the user (based on its person matching score that reflects the likelihood of it representing the same person), as described earlier in conjunction with FIG. 3.

Figure 7:
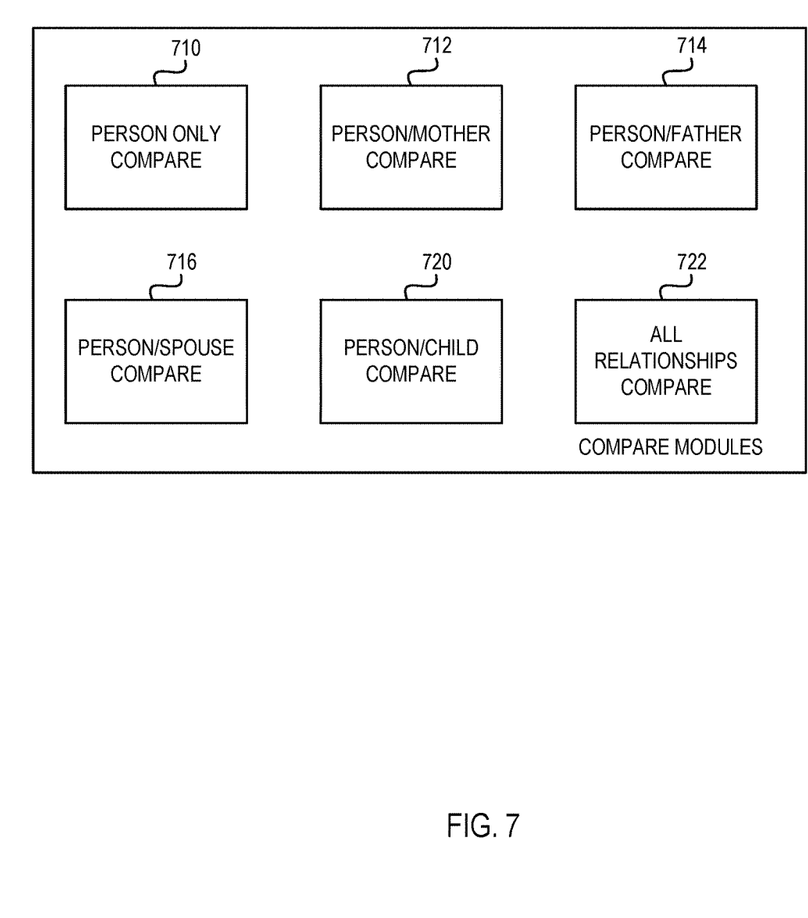
FIG. 7 illustrates compare modules representing algorithms for calculating sub-scores as part of developing a person match score.

FIG. 7 illustrates various compare modules that could be implemented by the management system 110 for developing match sub-scores, by individually comparing various corresponding nodes as described above. As seen in FIG. 7, the compared modules include a Person Only compare module 710, Person/Father Compare module 712, a Person/Mother Compare module 714, a Person/Spouse Compare module 716, a Person/Child Compare module 720 and an All Relationships Compare module 722.

The Person Only Compare module 710, in described embodiments, merely compares the data in one focus node to the data in the other focus node to determine the degree of match. The degree of match between the data (e.g., name and event data) may be established using the algorithms/rules as described above in conjunction with Table I.

The Person/Mother Compare module 712 compares data at corresponding mother relationship nodes to determine the degree of match, but also uses additional algorithms that take into account the reasons the corresponding mother node data might not match, such as remarriage. Thus, for example, if there is a high degree of match at the focus nodes (a high Person Only sub-score), the Person/Mother sub-score is not significantly lowered (see Person/Mother sub-score example in Table II above). The module 712 could also take into account the death of one of the persons in the corresponding mother relationship nodes, as described earlier.

The Person/Father Compare module 714 similarly compares data in the corresponding father relationship nodes to determine the degree of match, and may use algorithms similar to those described in conjunction with the Person/Mother compare module 712 to take into account reasons the corresponding father relationship node data might not match, such as remarriage.

The Person/Spouse compare module 716 similarly compares data in the corresponding spouse relationship nodes to determine the degree of match, and may also use algorithm similar to those described in conjunction with the Person/Mother Compare module 712.

The Person/Child compare module 720 similarly compares data in the corresponding children nodes to determine the degree of match. It may use algorithms to take into account reasons for not all of the children nodes matching. For example, if the dates on which the data two records were created are different, the absence of one child (e.g., because that child was born after one data record was created) could be taken into account and the sub-score not significantly lowered. Also, if there has been a likely remarriage of one parent (spouse nodes are different), then the different child nodes (particularly when the corresponding spouse nodes show different persons), would not significantly lower the Person/Child sub-score.

The All Relationships Compare module 722 merely compares the data in all the corresponding focus person and relationship nodes (the focus person, father, mother, spouse and child nodes) to determine the degree of match across all those nodes collectively. The degree of match between the data (e.g., name and event data) may be established using the algorithms/rules as described above in conjunction with Table I. It should be noted that the resulting All Relationships sub-score thus reflects an overall matching score, equivalent to the similarity score described earlier in conjunction with FIG. 3, step 360. The All Relationships Compare module 722 thus could be used to not only provide the All Relationships sub-score used as part of the person match score calculation (FIG. 4), but could also be used to provide the similarity score needed for the process described in conjunction with FIG. 3 (steps 410-430).

It should be appreciated that, while only four corresponding relationship nodes (or corresponding relationship node sets, in the case of children) are compared in FIG. 7 (i.e., mother, father, spouse, child/children), there could be fewer or more compared relationship nodes, depending on the amount of data available or desired for calculating the subject match score.

Figure 8:
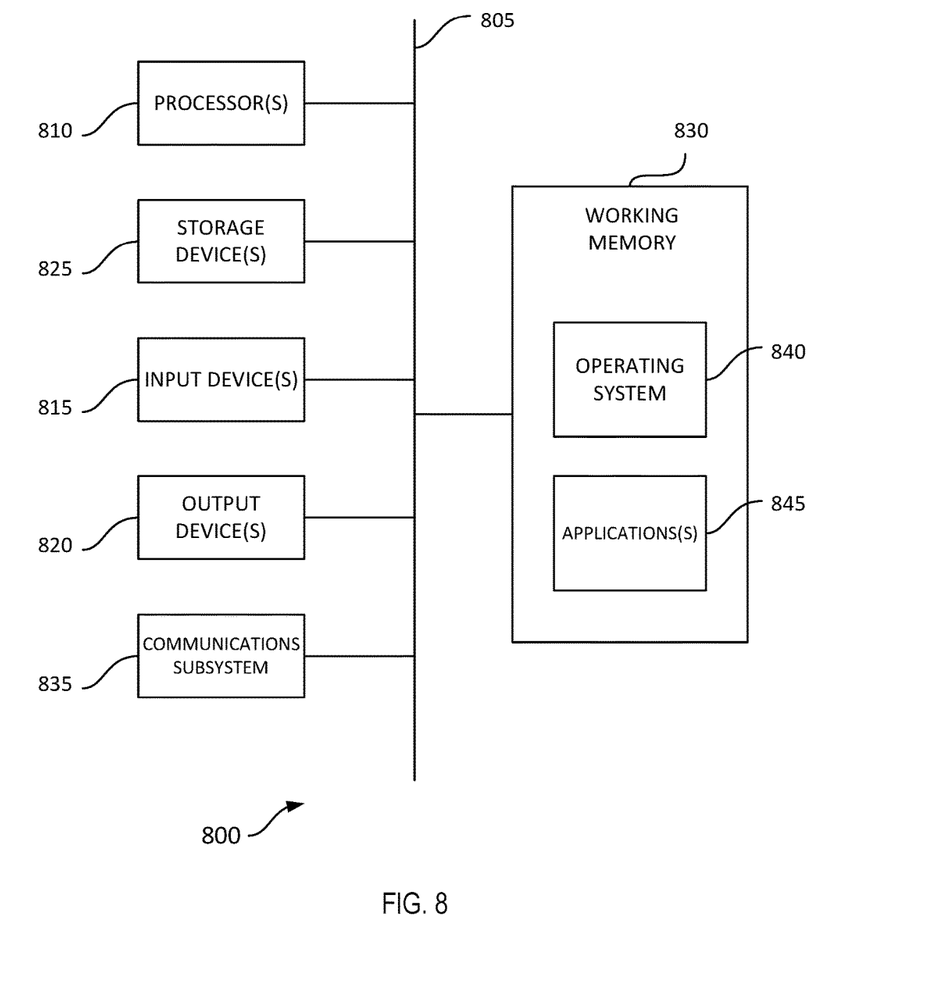
FIG. 8 is a block diagram illustrating an exemplary computer system upon which embodiments of the present invention may be implemented.

FIG. 8 is a block diagram illustrating an exemplary computer system upon which embodiments of the present invention may be implemented. This example illustrates a computer system 800 such as may be used, in whole, in part, or with various modifications, to provide the functions of the data record management system 110, as well as other components and functions of the invention described herein.

The computer system 800 is shown comprising hardware elements that can be electrically coupled or otherwise in communication via a bus 805. The hardware elements can include one or more processors 810, including, without limitation, one or more general-purpose processors and/or one or more special-purpose processors (such as digital signal processing chips, graphics acceleration chips, and/or the like); one or more input devices 815, which can include, without limitation, a mouse, a keyboard and/or the like; and one or more output devices 820, which can include, without limitation, a display device, a printer and/or the like.

The computer system 800 may further include one or more storage devices 825, which can comprise, without limitation, local and/or network accessible storage or memory systems having computer or machine readable media. Common forms of physical and/or tangible computer readable media include, as examples, hard disk, magnetic tape, or any other magnetic medium, an optical medium (such as CD-ROM), a random access memory (RAM), a read only memory (ROM) which can be programmable or flash-updateable or the like, and any other memory chip, cartridge, or medium from which a computer can read data, instructions and/or code. In many embodiments, the computer system 800 will further comprise a working memory 830, which could include (but is not limited to) a RAM or ROM device, as described above.

The computer system 800 also may further include a communications subsystem 835, such as (without limitation) a modem, a network card (wireless or wired), an infra-red communication device, or a wireless communication device and/or chipset, such as a Bluetooth® device, an 802.11 device, a WiFi device, a WiMax device, a near field communications (NFC) device, cellular communication facilities, etc. The communications subsystem 835 may permit data to be exchanged with a network, and/or any other devices described herein. Transmission media used by communications subsystem 835 (and the bus 805) may include copper wire, coaxial cables and fiber optics. Hence, transmission media can also take the form of waves (including, without limitation radio, acoustic and/or light waves, such as those generated during radio-wave and infra-red data communications).

The computer system 800 can also comprise software elements, illustrated within the working memory 830, including an operating system 840 and/or other code, such as one or more application programs 845, which may be designed to implement, as an example, the processes seen in FIGS. 3, 4 and 5, and thus provide specially designed and programmed devices for carrying out the unique elements of those processes and the novel features therein.

As an example, one or more methods discussed earlier might be implemented as code and/or instructions executable by a computer (and/or a processor within a computer). In some cases, a set of these instructions and/or code might be stored on a computer readable storage medium that is part of the system 800, such as the storage device(s) 825. In other embodiments, the storage medium might be separate from a computer system (e.g., a removable medium, such as a compact disc, etc.), and/or provided in an installation package with the instructions/code stored thereon. These instructions might take the form of code which is executable by the computer system 800 and/or might take the form of source and/or installable code, which is compiled and/or installed on the computer system 800 (e.g., using any of a variety of generally available compilers, installation programs, compression/decompression utilities, etc.). The communications subsystem 835 (and/or components thereof) generally will receive the signals (and/or the data, instructions, etc., carried by the signals), and the bus 805 then might carry those signals to the working memory 830, from which the processor(s) 805 retrieves and executes the instructions. The instructions received by the working memory 830 may optionally be stored on storage device 825 either before or after execution by the processor(s) 810.

While various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed or combined among various other system components in accordance with different embodiments of the invention. As one example, the data record management system 110 may be implemented by a single system having one or more storage device and processing elements. As another example, the system 110 may be implemented by plural systems, with their respective functions distributed across different systems either in one location or across a plurality of linked locations.

Moreover, while the various flows and processes described herein (e.g., those illustrated in FIGS. 3, 4 and 5) are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise. Consequently, although the invention has been described with respect to exemplary embodiments, it will be appreciated that the invention is intended to cover all modifications and equivalents within the scope of the following claims.

While a detailed description of presently preferred embodiments of the invention has been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A system for managing and retrieving data records, where different data records may relate to the same subject, and where identifying a selected data record accesses other data records related to the selected data record, the system comprising:
  a first database for storing individual data records and relationship data that reflects a relationship between different ones of the data records, each data record represented as a corresponding node in a plurality of nodes, with each node representing data pertaining to a subject, and with nodes interconnected to reflect a relationship between the nodes;
  a second database for storing subject match scores, each subject match score reflecting, for a given data record stored in the first database, the likelihood that one other data record stored in the first database relates to the same subject, with the subject match scores arranged in the second database so that there is associated, with an identifier for the given data record, one or more identifiers for other data records and the subject match score pertaining to the given data record and each of the other data records; and
  a data record management system, including a processor for determining whether two of the data records and their corresponding nodes relate to the same subject, the processor programmed to:
  identify a first focus node in the plurality of nodes relating to a first subject;
  identify a second focus node in the plurality of nodes relating to a second subject;
  identify, for the first focus node, a first plurality relationship nodes directly connected to the first focus node to reflect a relationship to the first subject, the first plurality of directly connected relationship nodes including at least a first relationship node connected to the first focus node;
  identify, for the second focus node, a second plurality of relationship nodes directly connected to the second focus node to reflect a relationship to the second subject, the second plurality of directly connected relationship nodes corresponding to at least some of the first plurality of directly connected relationship nodes and including at least a first relationship node connected to the second focus node;
  calculate a subject match score for the data record represented by the first focus node and the data record represented at the second focus node, by:
    combining a plurality of sub scores, the plurality of sub-scores including at least:
      a focus sub-score based on comparison of data in the first focus node to data in the second focus node; and
      a first relationship sub-score based on a comparison of data in the first relationship node connected to the first focus node to data in the first relationship node connected to the second focus node; and
    adjusting the first relationship sub-score based on the degree of match from comparison of data in the first focus node to data in the second focus node; and
  store, in the second database for any given data record, identifiers for one or more other data records and the subject match score pertaining to the given data record and each of the one or more other data records.

2. The system of claim 1, wherein the processor of the data record management system is further programmed to:
  receive at the data record management system, from a user, an identifier for a selected data record;
  in response to receiving the identifier for the selected data record, access the second database for one or more other data records that appear to relate to the same subject as the selected data record, based on subject match scores pertaining to the selected data record and the one or more other data records; and
  provide, to the user, the accessed one or more other data records that appear to relate to the same subject.

3. The system of claim 2, wherein the first plurality of relationship nodes directly connected to the first focus node include a second relationship node connected to the first focus node, wherein the second plurality of relationship nodes connected to the second focus node includes a second relationship node connected to the second focus node, wherein the plurality of sub-scores further include a second relationship sub-score based on a comparison of data in the second relationship node connected to the first focus node to data in the second relationship node connected to the second focus node, and wherein the second relationship sub-score is adjusted based on the degree of match from comparison of data in the first focus node to data in the second focus node.

4. The system of claim 3, wherein the first plurality relationship nodes directly connected to the first focus node further include a third relationship node connected to the first focus node, and wherein the second plurality relationship nodes directly connected to the second focus node further include a third relationship node connected to the second focus node, wherein the plurality of sub-scores further include a third relationship sub-score based on a comparison of data in the third relationship node connected to the first focus node to data in the third relationship node connected to the second focus node, and wherein the third relationship sub-score is adjusted based on the degree of match from comparison of data in the first focus node to data in the second focus node.

5. The system of claim 4, wherein the data records comprise genealogical data, wherein the first subject is a first person, wherein the second subject is a second person, and wherein the first relationship node in each of the first and second plurality of relationship nodes is a father relationship node, the second relationship node in each of the first and second plurality of relationship nodes is a mother relationship node, the third relationship in each of the first and second plurality of relationship nodes is a spouse relationship.

6. The system of claim 5, wherein the first plurality relationship nodes directly connected to the first focus node further include a fourth relationship node, and wherein the second plurality relationship nodes directly connected to the second focus node further include a fourth relationship node, wherein the plurality of sub-scores further include a fourth relationship sub-score based on a comparison of data in the fourth relationship node connected it to the first focus node to data in the fourth relationship node connected to the second focus node, wherein the fourth relationship sub-score is adjusted based on the degree of match from comparison of data in the first focus node to data in the second focus node, and wherein the fourth relationship node in each of the first and second plurality of relationship nodes is a child relationship node.

7. The system of claim 1, further comprising:
  determining a similarity sub-score for data pertaining to the first subject and the second subject, the similarity score based on comparing data at the first focus node to data at the second focus node and comparing data at nodes directly connected to the first focus node to data at corresponding nodes directly connected to the second focus node, with the similarity score reflecting the degree of match in all the compared data.

8. The system of claim 7, wherein the plurality of sub-scores includes the similarity sub-score.

9. The system of claim 1, wherein the subject match score is a person match score, wherein a plurality of person match scores are calculated, with one person match score calculated for each pair in a plurality of the data records.

10. The system of claim 9, wherein for data records for which person match scores have been calculated, one data record is determined to be a primary data record, wherein in response to a request for data records pertaining to an identified person, a group of data records are specified, including the primary data record and each of other data records in the group of data records, according to the person match score between the primary data record and each of the other data records in the group of data records.

11. The system of claim 1, wherein the data records are arranged in data structures having the form of a data tree, with the nodes interconnected in the data tree to reflect a relationship between the nodes.

12. The system of claim 11, wherein the system further comprises a family tree database storing the data records as family trees having nodes representing each person in the family tree.

13. A method for managing and retrieving data records, where different data records may relate to the same subject, and where identifying a selected data record accesses other data records related to the selected data record, the method comprising:
  storing, in a first database, individual data records and relationship data that reflects a relationship between different ones of the data records, each data record represented as a corresponding node in a plurality of nodes, with each node representing data pertaining to a subject, and with nodes interconnected to reflect a relationship between the nodes;
  storing, in a second database, subject match scores, each subject match score reflecting, for a given data record stored in the first database, the likelihood that one other data record stored in the first database relates to the same subject, with the subject match scores arranged in the second database so that there is associated, with an identifier for the given data record, one or more identifiers for other data records and the subject match score pertaining to the given data record and each of the other data records;
  determining, at a data record management system, whether two of the data records and their corresponding nodes relate to the same subject, including:
    identifying a first focus node in the plurality of nodes relating to a first subject;
    identifying a second focus node in the plurality of nodes relating to a second subject;
    identifying, for the first focus node, a first plurality relationship nodes directly connected to the first focus node to reflect a relationship to the first subject, the first plurality of directly connected relationship nodes including at least a first relationship node connected to the first focus node;
    identifying, for the second focus node, a second plurality of relationship nodes directly connected to the second focus node to reflect a relationship to the second subject, the second plurality of directly connected relationship nodes corresponding to at least some of the first plurality of directly connected relationship nodes and including at least a first relationship node connected to the second focus node;
    calculating a subject match score for the data record represented by the first focus node and the data record represented at the second focus node, including:
      combining a plurality of sub scores, the plurality of sub-scores including at least:
        a focus sub-score based on comparison of data in the first focus node to data in the second focus node;
        a first relationship sub-score based on a comparison of data in the first relationship node connected to the first focus node to data in the first relationship node connected to the second focus node; and
      adjusting the first relationship sub-score based on the degree of match from comparison of data in the first focus node to data in the second focus node;
  storing, in the second database, the calculated subject match score;
  receiving, at the data record management system, from a user, an identifier for a selected data record;
  in response to receiving the identifier for the selected data record, accessing the second database for one or more other data records that relate to the same subject as the selected data record, based on subject match scores pertaining to the selected data record and the one or more other data records; and
  providing, to the user, the accessed one or more other data records that relate to the same subject.

14. The method of claim 13, wherein the first plurality of relationship nodes directly connected to the first focus node include a second relationship node connected to the first focus node, wherein the second plurality of relationship nodes connected to the second focus node includes a second relationship node connected to the second focus node, wherein the plurality of sub-scores further include a second relationship sub-score based on a comparison of data in the second relationship node connected to the first focus node to data in the second relationship node connected to the second focus node, and wherein the second relationship sub-score is adjusted based on the degree of match from comparison of data in the first focus node to data in the second focus node.

15. The method of claim 14, wherein the first plurality relationship nodes directly connected to the first focus node further include a third relationship node connected to the first focus node, and wherein the second plurality relationship nodes directly connected to the second focus node further include a third relationship node connected to the second focus node, wherein the plurality of sub-scores further include a third relationship sub-score based on a comparison of data in the third relationship node connected to the first focus node to data in the third relationship node connected to the second focus node, and wherein the third relationship sub-score is adjusted based on the degree of match from comparison of data in the first focus node to data in the second focus node.

16. The method of claim 15, wherein the data records comprise genealogical data, wherein the first subject is a first person, wherein the second subject is a second person, and wherein the first relationship node in each of the first and second plurality of relationship nodes is a father relationship node, the second relationship node in each of the first and second plurality of relationship nodes is a mother relationship node, the third relationship in each of the first and second plurality of relationship nodes is a spouse relationship.

17. The method of claim 16, wherein the first plurality relationship nodes directly connected to the first focus node further include a fourth relationship node, and wherein the second plurality relationship nodes directly connected to the second focus node further include a fourth relationship node, wherein the plurality of sub-scores further include a fourth relationship sub-score based on a comparison of data in the fourth relationship node connected it to the first focus node to data in the fourth relationship node connected to the second focus node, wherein the fourth relationship sub-score is adjusted based on the degree of match from comparison of data in the first focus node to data in the second focus node, and wherein the fourth relationship node in each of the first and second plurality of relationship nodes is a child relationship node.

18. The method of claim 13, further comprising:
determining a similarity sub-score for data pertaining to the first subject and the second subject, the similarity score based on comparing data at the first focus node to data at the second focus node and comparing data at nodes directly connected to the first focus node to data at corresponding nodes directly connected to the second focus node, with the similarity score reflecting the degree of match in all the compared data.

19. The method of claim 18, wherein the plurality of sub-scores includes the similarity sub-score.

20. The method of claim 13, wherein the subject match score is a person match score, wherein a plurality of person match scores are calculated, with one person match score calculated for each pair in a plurality of the data records.

21. The method of claim 20, wherein for data records for which person match scores have been calculated, one data record is determined to be a primary data record, wherein in response to a request for data records pertaining to an identified person, a group of data records are specified, including the primary data record and each of other data records in the group of data records, according to the person match score between the primary data record and each of the other data records in the group of data records.

* * * * *